United States Patent
Amiga et al.

(10) Patent No.: US 10,664,648 B2
(45) Date of Patent: May 26, 2020

(54) WEBPAGE RENDERING USING A REMOTELY GENERATED LAYOUT NODE TREE

(71) Applicant: CA, Inc., San Jose, CA (US)

(72) Inventors: Dan Amiga, Ramat Hasharon (IL); Dor Knafo, Tel Aviv-Jaffa (IL); Yoav Horman, Tel Aviv-Jaffa (IL); Yehoshua Chen, Tel Aviv-Jaffa (IL)

(73) Assignee: CA, Inc., San Jose, CA (US)

(*) Notice: Subject to any disclaimer, the term of this patent is extended or adjusted under 35 U.S.C. 154(b) by 94 days.

(21) Appl. No.: 15/935,600

(22) Filed: Mar. 26, 2018

(65) Prior Publication Data

US 2019/0179879 A1    Jun. 13, 2019

Related U.S. Application Data

(60) Provisional application No. 62/596,363, filed on Dec. 8, 2017.

(51) Int. Cl.
  *G06F 17/00*    (2019.01)
  *G06F 40/10*    (2020.01)
  (Continued)

(52) U.S. Cl.
  CPC .......... *G06F 40/154* (2020.01); *G06F 16/957* (2019.01); *G06F 40/14* (2020.01); *H04L 63/00* (2013.01); *H04L 67/02* (2013.01)

(58) Field of Classification Search
  CPC .. G06F 17/2247; G06F 17/227; G06F 17/212; G06F 17/211; G06F 17/2705; G06F 16/2246; G06F 16/9027; G06F 21/566
  See application file for complete search history.

(56) References Cited

U.S. PATENT DOCUMENTS 6,359,633 B1    3/2002    Balasubramaniam et al.
7,415,672 B1*   8/2008    Fortini ................ G06F 3/0484
                                                          715/760
(Continued)

OTHER PUBLICATIONS

Grigorik, Ilya; "Render-tree Construction, Layout and Paint"; Web page, Jan. 3, 2018; 6 pages; accessed on Mar. 26, 2018; located at: https://developers.google.com/web/fundamentals/performance/critical-rendering-path/render-tree-construction.

(Continued)

*Primary Examiner* — Ariel Mercado
(74) *Attorney, Agent, or Firm* — Maschoff Brennan (57) ABSTRACT

Webpage rendering using a remotely generated layout node tree. In one embodiment, a method may include generating, at a remote network device, a layout tree based on webpage data received from a webserver, translating, at the remote network device, the layout tree into a layout node tree, serializing, at the remote network device, the layout node tree, sending, from the remote network device, the serialized layout node tree to a local network device, receiving, at the local network device, the serialized layout node tree, deserializing, at the local network device, the serialized layout node tree to obtain the layout node tree, constructing, at the local network device, a webpage using the layout node tree, and rendering, at the local network device, the webpage in a browser, the webpage being rendered to appear substantially the same as if the webpage were rendered on the remote network device using the layout tree.

20 Claims, 5 Drawing Sheets

(51) Int. Cl.

| | |
|---|---|
| *G06F 40/154* | (2020.01) |
| *H04L 29/08* | (2006.01) |
| *H04L 29/06* | (2006.01) |
| *G06F 16/957* | (2019.01) |
| *G06F 40/14* | (2020.01) |

(56) References Cited

U.S. PATENT DOCUMENTS

| | | | |
|---|---|---|---|
| 9,391,832 B1 | 7/2016 | Song et al. | |
| 2003/0221168 A1 | 11/2003 | Kozlov | |
| 2009/0292984 A1* | 11/2009 | Bauchot | G06Q 30/02 |
| | | | 715/234 |
| 2011/0078285 A1* | 3/2011 | Hawkins | H04W 4/18 |
| | | | 709/219 |
| 2016/0352803 A1 | 12/2016 | Amiga et al. | |
| 2018/0367552 A1* | 12/2018 | Burriesci | G06F 21/125 |

OTHER PUBLICATIONS

Rafael, W; Mutation-Summary; "A JavaScript library that makes observing changes to the DOM easy"; Web page; 2018; 3 pages; accessed on Mar. 26, 2018; located at: https://github.com/rafaelw/mutation-summary.

Chromestatus; Chrome Platform Status; "Headless Mode"; Web page; Jan. 19, 2018; 2 pages; accessed on Mar. 26, 2018; located at: https://www.chromestatus.com/feature/5678767817097216.

United States Patent and Trademark Office; International Search Report and Written Opinion issued in application No. PCT/US18/52731; dated Nov. 14, 2018; 7 pages.

* cited by examiner

WEBPAGE RENDERING USING A REMOTELY GENERATED LAYOUT NODE TREE

CROSS-REFERENCE TO A RELATED APPLICATION

This application claims the benefit of, and priority to, U.S. Provisional Application No. 62/596,363, filed Dec. 8, 2017, which is incorporated herein by reference in its entirety.

BACKGROUND

A webpage is a document written in a standard markup language that is typically downloaded to a local network device over the World Wide Web of the Internet from a webserver. Once downloaded, the webpage is then rendered to a user of the local network device in an application known as a web browser (or simply a "browser"). When a webpage that was downloaded from a webserver is rendered in a browser, the webpage may have sub-resources that are downloaded from other third-party webservers (such as ad network webservers, Content Distribution Network webservers, third party analytics webservers, etc.). Browsers may be configured to employ many different technologies and programming languages and may also be configured to execute executable code (that is downloaded as part of a webpage or from third-party webservers) during the rendering of the webpage. Allowing a browser to execute executable code that is included in a webpage (which may be a default setting in the browser) may add dynamic functionality to the webpage, thus making the webpage more useful to a user.

One potential problem with allowing a browser to execute executable code in a webpage while rendering the webpage is the potential for the executable code to be malicious. For example, a purveyor of a computer virus may embed the virus as malicious executable code in a webpage in an attempt to compromise a local network device with the virus. In particular, once the webpage is downloaded to a browser at the local network device and the malicious executable code is executed by the browser during the rendering of the webpage, the virus may compromise the local network device.

Therefore, although it may be useful to a user to allow a browser to execute executable code in a webpage while rendering the webpage, the potential for the executable code to be malicious may present a security threat to the local network device on which the browser is executing.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for webpage rendering using a remotely generated layout node tree may be performed, at least in part, by a remote network device including one or more processors and by a local network device including one or more processors. The method may include (a) generating, at the remote network device, a layout tree based on webpage data received from a webserver, with the webpage data received from the webserver including malicious executable content resulting in the layout tree including the malicious executable content, (b) translating, at the remote network device, the layout tree into a layout node tree by traversing each object in the layout tree, translating traversed markup language objects into markup language nodes and traversed style sheet objects into style sheet nodes, and adding the translated markup language nodes and the translated style sheet nodes to the layout node tree, the translating of the layout tree into the layout node tree resulting in the malicious executable content being excluded from the layout node tree, (c) serializing, at the remote network device, the layout node tree, (d) sending, from the remote network device, the serialized layout node tree to the local network device over a network, (e) receiving, at the local network device, the serialized layout node tree, (f) deserializing, at the local network device, the serialized layout node tree to obtain the layout node tree, (g) constructing, at the local network device, a webpage using the layout node tree, and (h) rendering, at the local network device, the webpage in a browser, the webpage being rendered to appear substantially the same as if the webpage were rendered on the remote network device using the layout tree.

In some embodiments, the method may further include (i) detecting, at the local network device, input from a user entered into the webpage rendered in the browser, (j) sending, from the local network device to the remote network device, the input, (k) sending, from the remote network device to the webserver, the input, (l) receiving, at the remote network device, updated webpage data from the webserver, and (m) repeating (a) through (h) based on the updated webpage data received from the webserver. In these embodiments, the repeating of (b) may be performed by only translating markup language objects and style sheet objects that were not previously translated, and the constructing at (g) may include reusing markup language nodes and style sheet nodes that were previously translated at (b) and previously deserialized at (f). Also, in these embodiments, the input from the user may include one or more of mouse input, keyboard input, and touchscreen input.

In some embodiments, the markup language objects may be Hypertext Markup Language (HTML) objects, the markup language nodes may be HTML nodes, the style sheet objects may be Cascading Style Sheet (CSS) objects, and the style sheet nodes may be CSS nodes. In these embodiments, the translating at (b) may further include omitting, from the layout tree, any traversed object that is not an HTML object or a CSS object. In these embodiments, the translating at (b) may further include, for each omitted object, connecting any descendant object of the omitted object in the layout tree to any ancestor object of the omitted object in the layout tree. In these embodiments, the translating at (b) of each traversed HTML object into an HTML node may include computing a CSS for the HTML object and adding the computed CSS to the HTML node.

In some embodiments, the generating at (a) may be performed in response to the browser, at the local network device, requesting access to the webserver. In some embodiments, the webpage data received from the webserver may include one or more of Hypertext Markup Language (HTML) data, Cascading Style Sheet (CSS) data, Fonts data, JavaScript® data, Scalable Vector Graphics (SVG) data, and Flash® data.

Also, in some embodiments, one or more non-transitory computer-readable media may include one or more computer-readable instructions that, when executed by one or more middlebox devices, cause the one or more middlebox devices to perform a method webpage rendering using a remotely generated layout node tree.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Although allowing a browser to execute executable code that is included in a webpage may add dynamic functionality to the webpage, the potential for the executable code to be malicious may present a security threat to the local network device on which the browser is executing. One solution for avoiding this security threat involves sandboxing where executable code is executed in a sandbox in the browser to attempt to prevent any malicious executable code from harming the local network device on which the browser is executing. Unfortunately, however, sandboxing methods generally fail due to difficulties in sandboxing all executable code in a webpage and/or difficulties in accurately identifying and sandboxing all executable code in a webpage that is malicious.

Another solution for avoiding this security threat involves remote webpage browsing. One method of remote webpage browsing is to remotely render the webpage on a secure remote network device where malicious executable code cannot damage a local network device, and then only send images of the remotely-rendered webpage from the remote network device to the browser on the local network device. Using this method, when a user enters input into the webpage, those inputs are transmitted to the remote network device and the webpage is again remotely rendered and images are again sent to the browser. Unfortunately, however, this image-based method of remote webpage browsing is generally too slow and has too much delay in responsiveness to user inputs to be acceptable for users. Another method for remote webpage browsing is to parse through a webpage on a secure remote network device in an attempt to identify and remove malicious executable code from the webpage (e.g., sanitize the webpage) before sending all or part of the webpage to the browser on the local network device for rendering. Unfortunately, however, this sanitization-based method of remote webpage browsing is generally too inconsistent to be relied on due to the difficulty in accurately identifying all executable code in a webpage that is malicious, and also often includes sending at least some original files from the webpage data (such as the original CSS file) which can include malicious executable content.

Some embodiments disclosed herein may enable webpage rendering using a remotely generated layout node tree. In particular, where a webpage includes executable content and where a layout tree is generated from the webpage and thus also includes the executable content, some embodiments may allow a remote network device to translate the layout tree into a layout node tree in a way that excludes the executable content. The layout node tree may include completely new webpage data without including any of the original webpage data. The layout node tree may then be sent to a local network device where a browser can construct and render the webpage based on the layout node tree. By excluding all executable content from the layout node tree for a webpage, any malicious executable content in the webpage is securely and reliably excluded from the layout node tree. Further, any malicious executable content is also excluded from the subsequent rendering of the webpage based on the layout node tree by the browser on the local network device. In this manner, a webpage may be rendered from a layout node tree at a local network device without requiring identification and sanitization of malicious executable content in the webpage data and without sending original files from the webpage data to the local network device, as happens in sanitization-based methods of remote webpage browsing, thus securely preventing any malicious executable content in the webpage data from being executed during the rendering of the webpage in the browser on the local network device. Further, some embodiments may allow the translation from a layout tree to a layout node tree to occur at speeds that are faster than image-based methods of remote webpage browsing and generally responsive enough to user input to be acceptable for users.

Figure 1:
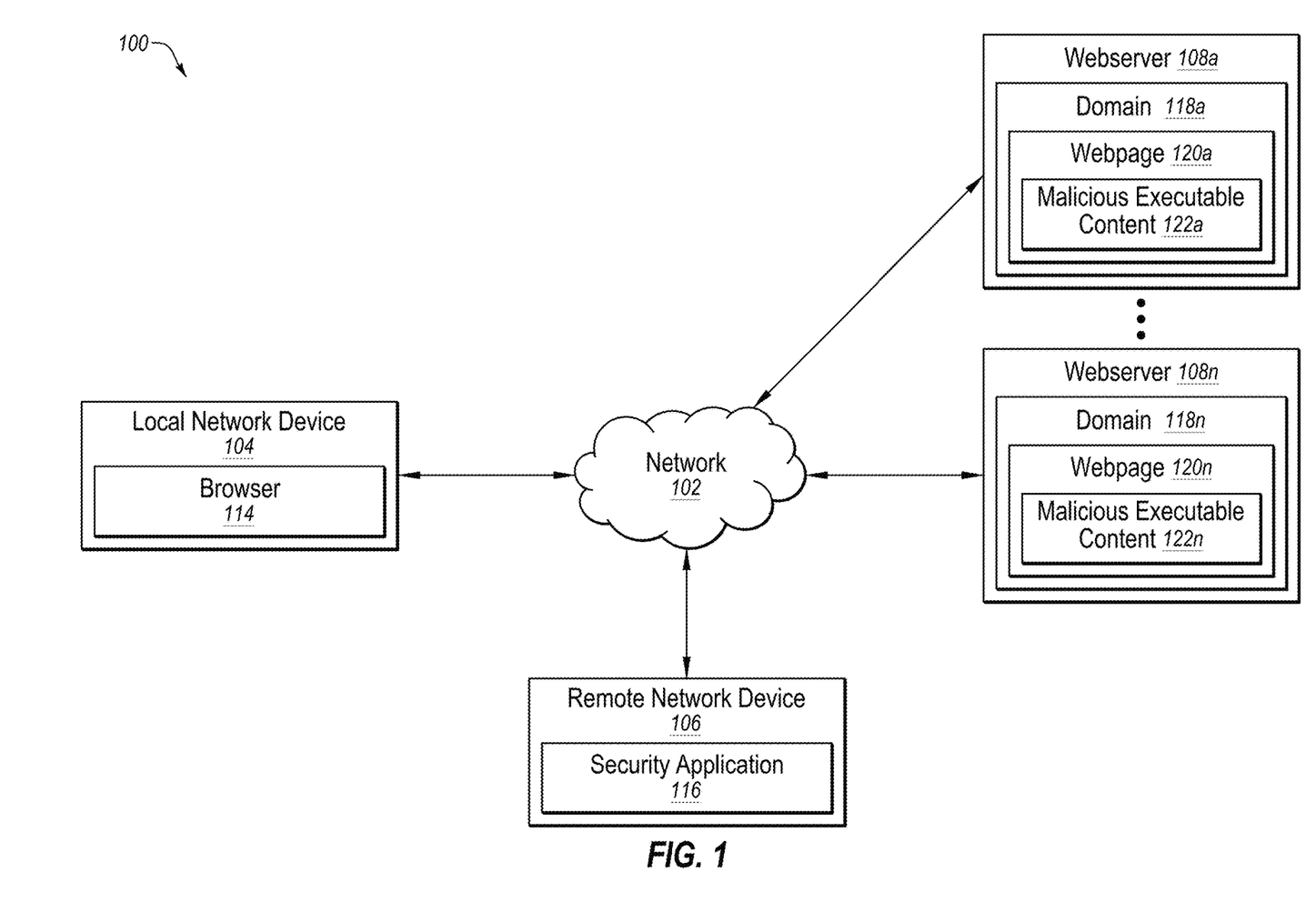
FIG. 1 illustrates an example system configured for webpage rendering using a remotely generated layout node tree.

Turning to the figures, FIG. 1 illustrates an example system 100 configured for webpage rendering using a remotely generated layout node tree. The system 100 may include a network 102, a local network device 104, a remote network device 106, and webservers 108a-108n.

In some embodiments, the network 102 may be configured to communicatively couple the local network device 104, the remote network device 106, and the webservers 108a-108n to one another using one or more network protocols, such as the network protocols available in connection with the World Wide Web. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
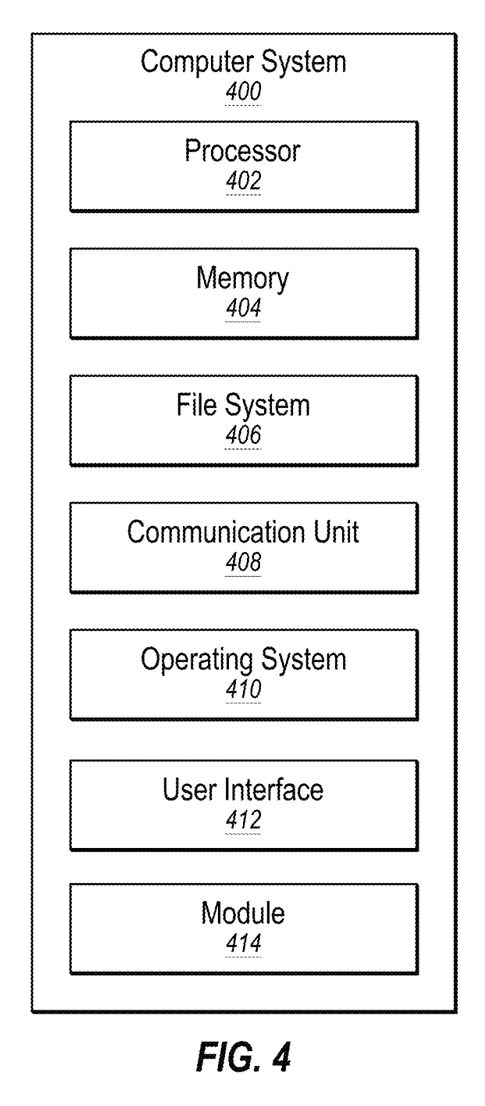
FIG. 4 illustrates an example computer system that may be employed in webpage rendering using a remotely generated layout node tree.

In some embodiments, the webservers 108a-108n may each be any computer system capable of communicating over the network 102 and capable of hosting webpages addressable at a particular web domain, examples of which are disclosed herein in connection with the computer system 400 of FIG. 4. The webservers 108a-108n may be addressable on domains 118a-118n and may host webpages 120a-120n, respectively. The webpages 120a-120n may include embedded executable content, such as malicious executable content 122a-122n. Each of the malicious executable content 122a-122n may be, for example, an executable file or executable script in a scripting language such as VBScript, AngularJS, JQuery, Bootstrap, AJAX, JScript, and Action- Script. The malicious functionality of the malicious executable content may include, for example, functionality typical of a spyware, a virus, a worm, a logic bomb, a trapdoor, a Trojan horse, a Remote Admin Trojan (RAT), a malware, a mobile malicious code, a malicious font, and a rootkit, or some combination thereof.

In some embodiments, the local network device 104 may be any computer system capable of communicating over the network 102 and executing a browser, examples of which are disclosed herein in connection with the computer system 400 of FIG. 4. The local network device 104 may include a browser 114. The browser 114 may be configured to render webpages, such as the webpages 120a-120n, to a user of the local network device 104.

In some embodiments, the remote network device 106 may be any computer system capable of communicating over the network 102 and capable of monitoring the local network device 104 in order to protect the local network device from webpages having malicious executable content, examples of which are disclosed herein in connection with the computer system 400 of FIG. 4. In some embodiments, the remote network device 106 may be employed by an organization that manages and/or protects the network 102 and/or the local network device 104, and/or any of the webservers 108a-108n. In some embodiments, the remote network device 106 may include a security application 116. The security application 116 may be configured to secure the local network device 104 from any malicious executable content found in a webpage, as disclosed in greater detail in connection with FIGS. 2 and 3A-3B herein. In some embodiments, the security application 116 may function as a remote isolation environment, where malicious executable content in webpage data can be safely transformed into a layout node tree that excludes the malicious executable content, thus protecting the local network device 104 from ever being exposed to any such malicious executable content. In some embodiments, the security application 116 may include, or be part of, a browser engine, such as a WebKit or Blink browser engine. In some embodiments, the remote network device 106, and the security application 116 thereon, may include, or be part of, a network security device or application such as Symantec Corporation's ProxySG S200/S400/S500 appliance or virtual appliance or cloud service, Symantec Corporation's Secure Web Gateway (SWG), Symantec Corporation's Secure Web Gateway Virtual Appliance (SWG VA), Symantec Corporation's Advanced Secure Gateway (ASG) S200/S400/S500, or Symantec Corporation's Web Isolation.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
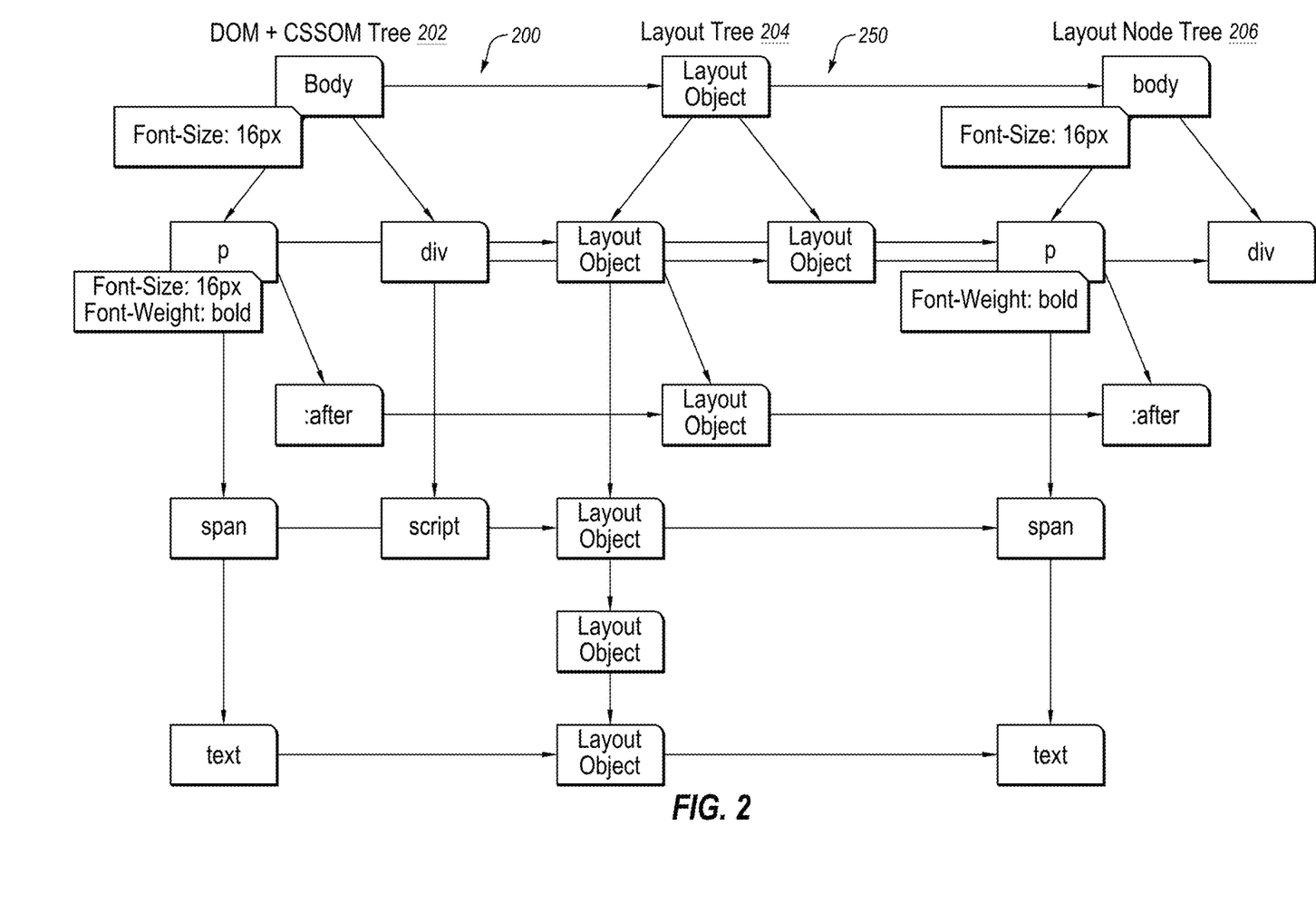
FIG. 2 illustrates a generation of a layout tree from a Document Object Model (DOM) tree, and a translation of the layout tree into a layout node tree.

FIG. 2 illustrates a generation 200 of a layout tree 204 from a Document Object Model (DOM)+CSS Object Model (CSSOM) tree 202, and a translation 250 of the layout tree 204 into a layout node tree 206. The generation 200 and the translation 250 may be performed, for example, by the security application 116 on the remote network device 106 of FIG. 1. The generation 200 and the translation 250 will now be discussed in connection with FIGS. 1 and 2.

When a webpage, such as the webpage 120a, is requested by the browser 114 on the local network device 104, the security application 116 on the remote network device 106 may intercept the request, or the response to the request, in order to securely prevent the webpage data of the webpage 120a from being sent directly from the webserver 108a to the browser 114. After intercepting the request, or the response to the request, the security application 116 may receive webpage data corresponding to the webpage 120a from the webserver 108a. This webpage data may include, for example, one or more of Hypertext Markup Language (HTML) data, Cascading Style Sheet (CSS) data, Fonts data, JavaScript® data, Scalable Vector Graphics (SVG) data, and Flash® data, and data in any other browser rendering format. In addition, some portion of the received webpage data may include the malicious executable content 122a. From this webpage data, the security application 116 may generate one or more object model trees, such as the DOM+CSSOM tree 202, which may be based on HTML and CSS data, respectively, that was received as part of the webpage data.

The security application 116 may next generate the layout tree 204 from one or more of these object model trees. This generation 200 may involve generating layout objects of the layout tree 204 from object model tree objects. For example, where the layout tree 204 is generated from the DOM+CSSOM tree 202, the security application 116 may generate the layout tree 204 from the DOM+CSSOM tree 202 by traversing each visible object of the DOM+CSSOM tree 202, finding the appropriate CSSOM object, and applying the appropriate CSSOM object to the visible object in order to generate a layout object in the layout tree 204. Because the layout tree 204 is generated directly from webpage data received from the webserver 108a, and because the webpage data includes the malicious executable content 122a, the generation 200 of the layout tree 204 may continue to include the malicious executable content 122a.

In order to exclude the malicious executable content 122a from the webpage that is ultimately rendered by the browser 114 at the local network device 104, and to generally avoid sending any original webpage data along to the local network device 104, the security application 116 may next perform the translation 250 of the layout tree 204 into a layout node tree 206, thus resulting in the layout node tree 206 including completely new webpage data without including any of the original webpage data. The translation 250 may include the security application 116 traversing each layout object in the layout tree, translating traversed Hypertext Markup Language (HTML) layout objects into HTML nodes and translating traversed Cascading Style Sheet (CSS) layout objects into CSS nodes, and adding the translated HTML nodes and the translated CSS nodes to the layout node tree 206. Because some layout objects in the layout tree 204 do not represent an actual HTML layout object or CSS layout object (such as anonymous layout objects), these layout objects may be omitted from the layout tree 204 during the translation process since they may be calculated later at the browser 114 when the browser 114 constructs a version of the webpage 120a with new HTML nodes and CSS nodes. Whenever such a layout object is omitted, its children may be connected to its parent.

The translation 250 of the layout tree 204 into the layout node tree 206 may include dividing the layout objects of the layout tree 204 by type, and then treating each type as follows:

1. Anonymous Layout Object—When a layout object does not have an associated node it is called "anonymous." An example may be anonymous table parts. If the current layout object is anonymous, this layout object may be translated during the translation 250 into a node that is added to the layout node tree, taking into account its connections to sibling(s) and parent.

2. Layout Object Associated with a Text—A layout object used to split text into lines depending on webpage structure. Each line may have its own layout object. If the current layout object is a text element that might span over multiple lines, the translation 250 may calculate the whole text and create the appropriate layout node with the text.
3. Layout Object Associated with an HTML Element—A layout object that represents an HTML element. If the current layout object is an HTML element, the translation 250 may create a matching layout node for it with the appropriate computed styles and a white list of attribute values.
4. Layout Object Associated with a Pseudo Element (e.g., :after, :before)—A Pseudo-element represents an abstract element of the document beyond those elements explicitly created by the document language. Since they are not restricted to fitting into the document tree, they can be used to select and style portions of the document that do not necessarily map to the document's tree structure. For instance a ":first-line" pseudo element can select content after the first formatted line of an element. If the current layout object is a pseudo element, the translation 250 may determine what layout nodes should be affected ("associated layout object") and from there the translation 250 may take the computed style from the pseudo element and compose a new CSS rule to be applied on the associated layout object.
5. Shadow Element Layout Object—A shadow element is an element that belongs to a sub-tree in the layout tree 204 that has its distinct CSS styles. If the current layout object is associated with a shadow element:
   If this is a shadow element that was created under a subtree that was created by the webpage developer, the translation 250 may apply steps #1-#4 mentioned above.
   If this is a shadow element that was created by the browser itself (e.g., video controls), the translation 250 may detect if these are external SVG components and if so, the translation 250 may apply steps #1-#4 above—otherwise, the translation 250 may ignore this layout object.

The translation 250 of the layout tree 204 into the layout node tree 206 may further include determining if new style prints were added and synchronizing those to the local network device 104, detecting general pseudo styles that are not associated with elements (such as scroll bars and selection) and synchronizing those to the local network device 104, and detecting new custom fonts that were created and loaded and synchronizing those to the local network device 104 (potentially with an optimal reconstruction phase to remove vulnerabilities).

The translation 250 of the layout tree 204 into the layout node tree 206 may result in the malicious executable content 122a being excluded from the layout node tree 206. The security application 116 may then serialize and send the layout node tree 206 to the local network device 104 where the browser 114 can construct and render a version of the webpage 120a based on the layout node tree 206. By excluding all executable content from the layout node tree 206 for the rendered version of the webpage 120a, the malicious executable content 122a in the webpage 120a may be reliably excluded from the layout node tree 206, and thus also excluded from the subsequent rendering of the version of the webpage 120a based on the layout node tree 206 by the browser 114. In this manner, the version of the webpage 120a may be rendered from the layout node tree 206 at the local network device 104 without requiring identification and sanitization of the malicious executable content 122a in the webpage data received from the webserver 108a, and without sending original files from the webpage data to the local network device 104, thus securely preventing the malicious executable content 122a in the webpage data from being executed during the rendering of the webpage 120a in the browser 114 on the local network device 104. Further, some embodiments may allow the translation 250 from the layout tree 204 to the layout node tree 206 to occur at speeds that are faster than image-based methods of remote webpage browsing and generally responsive enough to user input to be acceptable for users.

Modifications, additions, or omissions may be made to the generation 200 and the translation 250 without departing from the scope of the present disclosure. For example, the generation 200 and the translation 250 may be repeated, at least for modified portions of the layout tree 204, one or more times for a given webpage in order to repeatedly update the rendering of the webpage at the browser 114.

Figure 3A:
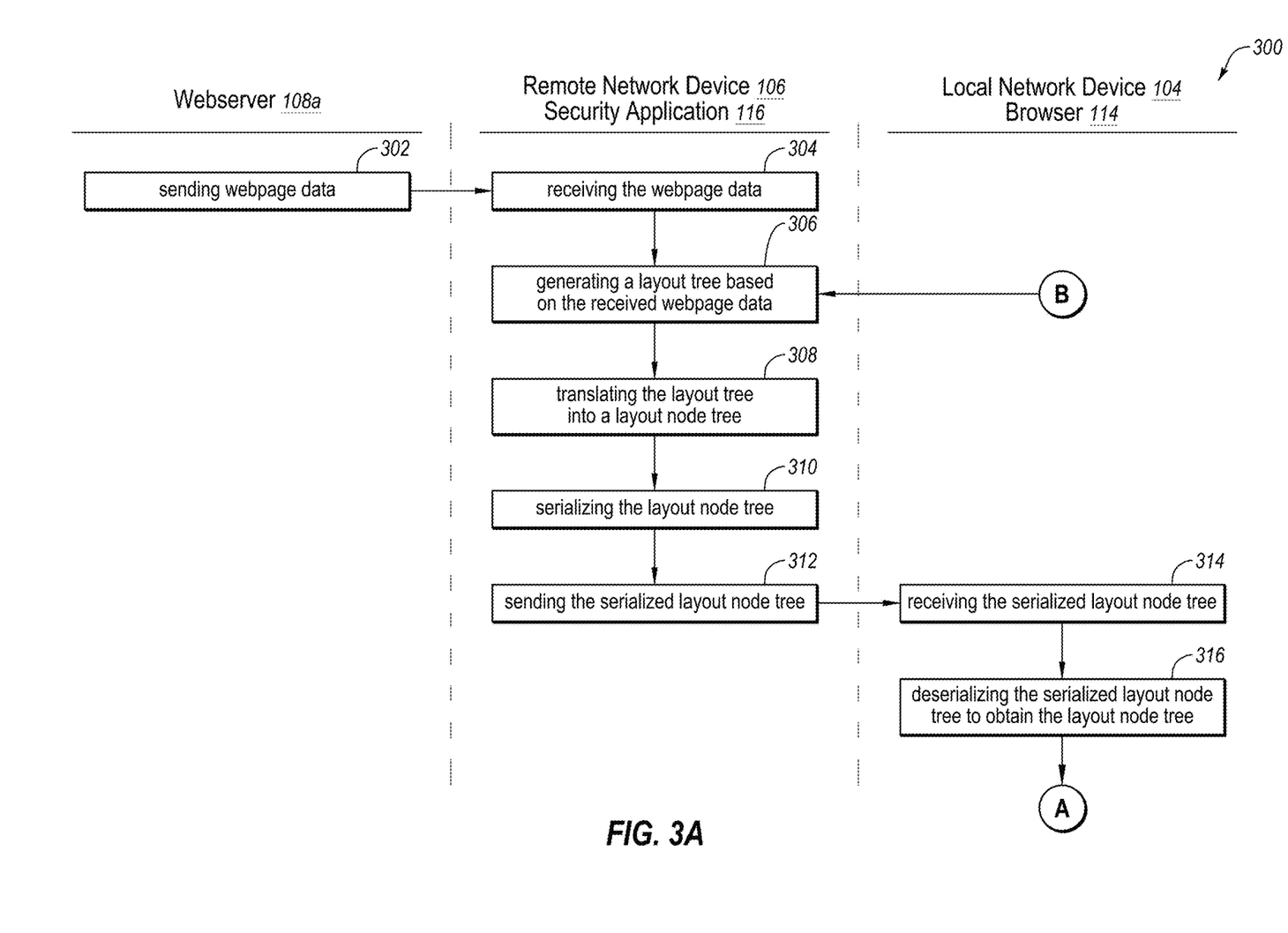
FIGS. 3A-3B are a flowchart of an example method for webpage rendering using a remotely generated layout node tree.
Figure 3B:
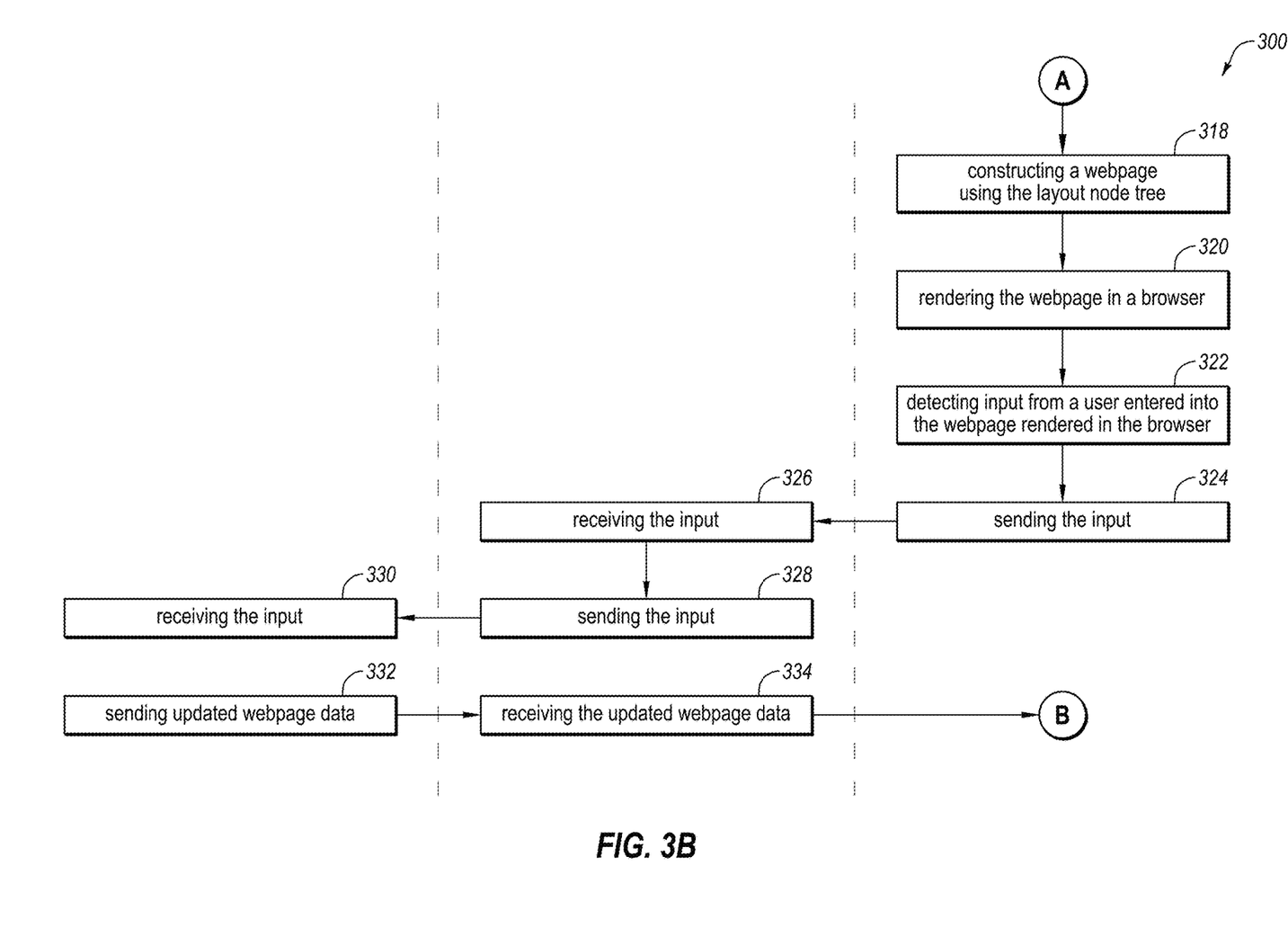

FIGS. 3A-3B are a flowchart of an example method 300 for webpage rendering using a remotely generated layout node tree. The method 300 may be performed, in some embodiments, by a device or system, such as by the webserver 108a, by the security application 116 on the remote network device 106, and by the browser 114 on the local network device. In these and other embodiments, the method 300 may be performed by one or more processors based on one or more computer-readable instructions stored on one or more non-transitory computer-readable media. The method 300 will now be described in connection with FIGS. 1, 2, and 3A-3B.

In some embodiments, the initial actions of the method 300 (e.g., actions 302, 304, and/or 306) may be performed in response to a browser, at a local network device, requesting access to a webserver. For example, a user may type a URL into the browser 114 on the local network device 104, such as "www.virus.com." This URL may correspond to the domain 118a and the webpage 120a hosted at the webserver 108a. In response to the user typing this URL into the browser 114, the browser 114 may send a request to the webserver 108a for the webpage 120a at the domain 118a. This request, or the response to this request from the webserver 108a, may then be intercepted by the security application 116 in order to securely prevent the webserver 108a from sending webpage data corresponding to the webpage 120a directly to the browser 114. This interception by the security application 116 may then result in the actions 302, 304, and/or 306.

The method 300 may include, at action 302, sending webpage data and, at action 304, receiving the webpage data. In some embodiments, the webpage data received from the webserver may include one or more of Hypertext Markup Language (HTML) data, Cascading Style Sheet (CSS) data, Fonts data, JavaScript® data, Scalable Vector Graphics (SVG) data, Flash® data, and data in any other browser rendering format. For example, the webserver 108a may send, at action 302, and the security application 116 may receive, at action 304, webpage data corresponding to the webpage 120a that is hosted at the domain 118a on the webserver 108a. The received webpage data may include, for example, HTML data, CSS data, Fonts data, JavaScript® data, SVG data, Flash® data, and data in any other browser rendering format, and some portion of the received webpage data may include the malicious executable content 122a.

The method 300 may include, at action 306, generating a layout tree based on the received webpage data. In some embodiments, if the webpage data received from the webserver includes malicious executable content, this may result in the layout tree also including the malicious executable content. For example, the security application 116 may generate, at action 306, the layout tree 204 based on the webpage data that was received from the webserver 108a at action 304. Because the received webpage data (from which the layout tree 204 is generated) may include the malicious executable content 122a, the layout tree 204 may also include the malicious executable content 122a.

The method 300 may include, at action 308, translating the layout tree into a layout node tree. In some embodiments, the translating at action 308 may include traversing each object in the layout tree, translating traversed markup language objects into markup language nodes and traversed style sheet objects into style sheet nodes, and adding the translated markup language nodes and the translated style sheet nodes to the layout node tree. In some embodiments, the translating at action 308 may result in the malicious executable content being excluded from the layout node tree. In some embodiments, the markup language objects may be Hypertext Markup Language (HTML) objects, the markup language nodes may be HTML nodes, the style sheet objects may be Cascading Style Sheet (CSS) objects, and the style sheet nodes may be CSS nodes. For example, the security application 116 may translate, at action 308, the layout tree 204 into the layout node tree 206 by traversing each object in the layout tree 204, translating traversed HTML objects into HTML nodes and traversed CSS objects into CSS nodes, and adding the translated HTML nodes and the translated CSS nodes to the layout node tree 206. This translating at action 308 may result in the malicious executable content 122a being excluded from the layout node tree 206.

In some embodiments, the translating at action 308 may further include omitting, from the layout tree, any traversed object that is not an HTML object or a CSS object. In these embodiments, the translating at action 308 may further include, for each omitted object, connecting any descendant object of the omitted object in the layout tree to any ancestor object of the omitted object in the layout tree. For example, the security application 116 may, as part of the translating at action 308, omit, from the layout tree 204, any traversed layout object that is not an HTML object or a CSS object, and then connect any descendant object of the omitted object in the layout tree 204 to any ancestor object of the omitted object in the layout tree 204. This connecting may maintain the structure of the layout tree 204 even though certain layout objects have been omitted.

The method 300 may include, at action 310, serializing the layout node tree. For example, the security application 116 may serialize, at action 310, the layout node tree 206.

The method 300 may include, at action 312, sending the serialized layout node tree and, at action 324, receiving the serialized layout node tree. For example, the security application 116 on the remote network device 106 may send, at action 312, and the browser 114 on the local network device 104 may receive, at action 314, the serialized layout node tree.

The method 300 may include, at action 316, deserializing the serialized layout node tree to obtain the layout node tree. For example, the browser 114 may deserialize, at action 316, the serialized layout node tree, resulting in the layout node tree 206.

The method 300 may include, at action 318, constructing a webpage using the layout node tree. For example, the browser 114 may construct, at action 318, a version of the webpage 120a using the layout node tree 206.

The method 300 may include, at action 320, rendering the webpage in a browser. In some embodiments, the webpage may be rendered to appear substantially the same as if the webpage were rendered on the remote network device using the layout tree. For example, the browser 114 may render, at action 320, in the browser 114 the version of the webpage 120a that was constructed using the layout node tree 206 at action 318. And even though the layout node tree 206 was generated in a way that excludes any executable content that may be included in the layout tree 204, the version of the webpage 120a that is constructed and rendered using the layout node tree 206 may be rendered to appear substantially the same as if it were rendered on the remote network device 106 using the layout tree 204. This substantially same website rendering may be due, at least in part, to the HTML objects and CSS objects being translated together at action 308. Therefore, the exclusion of the malicious executable content 122a may be hidden from the user of the browser 114 at the local network device 104 because the rendered webpage appears substantially the same to the user as if the user were accessing the webpage 120a directly from the webserver 108a.

The method 300 may include, at action 322, detecting input from a user entered into the webpage rendered in the browser. In some embodiments, the input from the user may include mouse input and/or may include keyboard input and/or other types of input such as touchscreen input. For example, the browser 114 may detect, at action 322, input from a user entered into the version of the webpage 120a rendered in the browser 114, such as a clicking of a mouse or a typing of keys on a keyboard or a pinch or zoom touching input on a touchscreen.

The method 300 may include, at action 324, sending the input and, at action 326, receiving the input. For example, the browser 114 may send, at action 324, and the security application 116 may receive, at action 326, the input that the user entered into the browser 114 at action 322.

The method 300 may include, at action 328, sending the input and, at action 330, receiving the input. For example, the security application 116 may send, at action 328, and the webserver 108a may receive, at action 330, the input. The method 300 may include, at action 332, sending updated webpage data and, at action 334, receiving the updated webpage data. For example, the webserver 108a may send, at action 332, and the security module may receive, at action 334, the updated webpage data.

In some embodiments, the actions 328-334 may be replaced with a determination at the remote network device as to how the input would cause the rendering of the webpage to be modified (such as through modifications to the layout tree 204), without actually sending the input along to the webserver 108a to make this determination. For example, instead of the actions 328-334, updated webpage data could be generated by the security application 116 without communicating further with the webserver 108a.

After the action 332, the method 300 may include the repeating of actions 306 to 320 based on the updated webpage data received from the webserver. For example, after action 332, the security module may repeat the action 306 by generating a layout tree based on updated webpage data that was received at action 334, and then also proceed with action 308, and so forth. In some embodiments, the repeating of the translating at action 308 may be performed by only translating HTML objects and CSS Objects that were not previously translated in prior performances of action 308, and the constructing at action 318 may include reusing HTML nodes and CSS nodes that were previously translated in prior performances of action 308 and previously deserialized in prior performances of action 316. For example, in these embodiments, subsequent performances of the translating by the security application 116 at action 308 may be faster because only modified (also known as mutated) HTML objects and CSS Objects in the layout tree 204 are translated, whereas the prior translations of unmodified HTML objects and CSS Objects from the prior layout node tree 206 are reused by the browser 114. Hooks may be included in some of the actions of the method 300 in order to help identify and aggregate modification to the layout tree 204. These modified objects may be sorted topologically so that each modified node is translated after its parent and its next sibling, enabling the layout node tree 206 to be translated in an efficient order. Faster performances of the translating by the security application 116 at action 308 may result in faster performances of the actions 310-318, resulting in a faster rending by the browser 114 at action 320, thus improving the responsiveness of the rendered webpage for the user of the browser 114 on the local network device 104.

The method 300 may thus be employed, in some embodiments, to render a version of the webpage 120a using the remotely generated layout node tree 206. By excluding all executable content from the layout node tree 206 for the webpage 120a, the method 300 may reliable exclude the malicious executable content 122a in the webpage 120a from the layout node tree 206, and thus also reliably exclude the malicious executable content 122a from the subsequent rendering by the browser 114 of the version of the webpage 120a based on the layout node tree 206. In this manner, the method 300 may render a version of the webpage 120a from the layout node tree 206 at the local network device 104 without requiring identification and sanitization of the malicious executable content 122a in the webpage data received from the webserver 108a, and without sending original files from the webpage data to the local network device 104, thus securely preventing the malicious executable content 122a in the webpage data from being executed during the rendering of the webpage 120a in the browser 114 on the local network device 104. Further, some embodiments of the method 300 may allow the translation from the layout tree 204 to the layout node tree 206 to occur at speeds that are faster than image-based methods of remote webpage browsing and generally responsive enough to user input to be acceptable for users.

Although the actions of the method 300 are illustrated in FIGS. 3A-3B as discrete actions, various actions may be divided into additional actions, combined into fewer actions, reordered, expanded, or eliminated, depending on the desired implementation. For example, in some embodiments, action 308 may be performed separately from the other actions of the method 300. Also, in some embodiments, actions 306-320 may be performed separately from the other actions of the method 300.

Further, it is understood that the method 300 may improve the functioning of a computer system itself. For example, the functioning of local network device 104 and/or the remote network device 106 of FIG. 1 may itself be improved by the method 300. For example, the local network device 104 and/or the remote network device 106 may be improved by the method 300 translating the layout tree 204 into the layout node tree 206 because this translation may reliably exclude the malicious executable content 122a in the webpage 120a from the layout node tree 206, and thus also reliably exclude the malicious executable content 122a from the subsequent rendering by the browser 114 of the version of the webpage 120a based on the layout node tree 206, thus allowing the remote network device 106 to protect the local network device 104 from the malicious executable content 122a.

Also, the method 300 may improve the technical field of remote webpage browsing. For example, by the method 300 remotely generating the layout node tree 206 that reliably excludes any malicious executable content from a webpage, and by doing so without requiring identification and sanitization of malicious executable content in webpage data and without sending original files from the webpage data to the local network device and at speeds that are faster and generally more responsive to user input, the method 300 is an improvement over conventional methods of remote webpage browsing such as image-based methods that are unacceptably slow or sanitization-based methods that are unacceptably unreliable.

FIG. 4 illustrates an example computer system 400 that may be employed in webpage rendering using a remotely generated layout node tree. In some embodiments, the computer system 400 may be part of any of the systems or devices described in this disclosure. For example, the computer system 400 may be part of any of the local network device 104, the remote network device 106, and the webservers 108a-108n of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a network device, a network security appliance, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIGS. 3A and 3B.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIGS. 3A and 3B. These computer-executable instructions may be included, for example, in the operating system 410, in one or more applications, such as the browser 114 or the security application 116 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIGS. 3A and 3B. In some embodiments, the module 414 may be part of the operating system 410 or may be part of an application of the computer system 400, or may be some combination thereof. In some embodiments, the module 414 may function as any one of the browser 114 and the security application 116 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations,"

without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for webpage rendering using a remotely generated layout node tree, at least a portion of the method being performed by a remote network device comprising one or more processors and by a local network device comprising one or more processors, the method comprising:
   (a) generating, at the remote network device, a layout tree based on webpage data received from a webserver, the webpage data received from the webserver including malicious executable content resulting in the layout tree including the malicious executable content;
   (b) translating, at the remote network device, the layout tree into a layout node tree by traversing each object in the layout tree, translating traversed markup language objects into markup language nodes and traversed style sheet objects into style sheet nodes, and adding the translated markup language nodes and the translated style sheet nodes to the layout node tree, the translating of the layout tree into the layout node tree resulting in the malicious executable content being excluded from the layout node tree;
   (c) serializing, at the remote network device, the layout node tree;
   (d) sending, from the remote network device, the serialized layout node tree to the local network device over a network;
   (e) receiving, at the local network device, the serialized layout node tree;
   (f) deserializing, at the local network device, the serialized layout node tree to obtain the layout node tree;
   (g) constructing, at the local network device, a webpage using the layout node tree; and
   (h) rendering, at the local network device, the webpage in a browser, the webpage being rendered to appear as if the webpage were rendered on the remote network device using the layout tree.

2. The method of claim 1, wherein:
   the markup language objects are Hypertext Markup Language (HTML) objects;
   the markup language nodes are HTML nodes;
   the style sheet objects are Cascading Style Sheet (CSS) objects; and
   the style sheet nodes are CSS nodes.

3. The method of claim 2, wherein the translating at (b) further includes omitting, from the layout tree, any traversed object that is not an HTML object or a CSS object.

4. The method of claim 3, wherein the translating at (b) further includes, for each omitted object, connecting any descendant object of the omitted object in the layout tree to any ancestor object of the omitted object in the layout tree.

5. The method of claim 2, wherein the translating at (b) of each traversed HTML object into an HTML node includes computing a CSS for the HTML object and adding the computed CSS to the HTML node.

6. The method of claim 1, wherein the generating at (a) is performed in response to the browser, at the local network device, requesting access to the webserver.

7. The method of claim 1, wherein the webpage data received from the webserver includes one or more of Hypertext Markup Language (HTML) data, Cascading Style Sheet (CSS) data, Fonts data, data, and Scalable Vector Graphics (SVG) data.

8. The method of claim 1, further comprising:
   (i) detecting, at the local network device, input from a user entered into the webpage rendered in the browser;
   (j) sending, from the local network device to the remote network device, the input;
   (k) sending, from the remote network device to the webserver, the input;
   (l) receiving, at the remote network device, updated webpage data from the webserver; and
   (m) repeating (a) through (h) based on the updated webpage data received from the webserver.

9. The method of claim 8, wherein:
   the repeating of (b) is performed by only translating markup language objects and style sheet objects that were not previously translated; and
   the constructing at (g) includes reusing markup language nodes and style sheet nodes that were previously translated at (b) and previously deserialized at (f).

10. The method of claim 8, wherein the input from the user includes one or more of mouse input, keyboard input, and touchscreen input.

11. One or more non-transitory computer-readable media comprising one or more computer-readable instructions that, when executed by one or more processors of a remote network device or of a local network device, cause the remote network device or the local network device to perform a method for webpage rendering using a remotely generated layout node tree, the method comprising:

(a) generating, at the remote network device, a layout tree based on webpage data received from a webserver, the webpage data received from the webserver including malicious executable content resulting in the layout tree including the malicious executable content;

(b) translating, at the remote network device, the layout tree into a layout node tree by traversing each object in the layout tree, translating traversed markup language objects into markup language nodes and traversed style sheet objects into style sheet nodes, and adding the translated markup language nodes and the translated style sheet nodes to the layout node tree, the translating of the layout tree into the layout node tree resulting in the malicious executable content being excluded from the layout node tree;

(c) serializing, at the remote network device, the layout node tree;

(d) sending, from the remote network device, the serialized layout node tree to the local network device over a network;

(e) receiving, at the local network device, the serialized layout node tree;

(f) deserializing, at the local network device, the serialized layout node tree to obtain the layout node tree;

(g) constructing, at the local network device, a webpage using the layout node tree; and (h) rendering, at the local network device, the webpage in a browser, the webpage being rendered to appear as if the webpage were rendered on the remote network device using the layout tree.

12. The one or more non-transitory computer-readable media of claim 11, wherein:

the markup language objects are Hypertext Markup Language (HTML) objects;

the markup language nodes are HTML nodes;

the style sheet objects are Cascading Style Sheet (CSS) objects; and the style sheet nodes are CSS nodes.

13. The one or more non-transitory computer-readable media of claim 12, wherein the translating at (b) further includes omitting, from the layout tree, any traversed object that is not an HTML object or a CSS object.

14. The one or more non-transitory computer-readable media of claim 13, wherein the translating at (b) further includes, for each omitted object, connecting any descendant object of the omitted object in the layout tree to any ancestor object of the omitted object in the layout tree.

15. The one or more non-transitory computer-readable media of claim 12, wherein the translating at (b) of each traversed HTML object into an HTML node includes computing the CSS for the HTML object and adding the computed CSS to the HTML node.

16. The one or more non-transitory computer-readable media of claim 11, wherein the generating at (a) is performed in response to the browser, at the local network device, requesting access to the webserver.

17. The one or more non-transitory computer-readable media of claim 11, wherein the webpage data received from the webserver includes one or more of Hypertext Markup Language (HTML) data, Cascading Style Sheet (CSS) data, Fonts data, script data, and Scalable Vector Graphics (SVG) data.

18. The one or more non-transitory computer-readable media of claim 11, wherein the method further comprises:

(i) detecting, at the local network device, input from a user entered into the webpage rendered in the browser;

(j) sending, from the local network device to the remote network device, the input;

(k) sending, from the remote network device to the webserver, the input;

(l) receiving, at the remote network device, updated webpage data from the webserver; and (m) repeating (a) through (h) based on the updated webpage data received from the web server.

19. The one or more non-transitory computer-readable media of claim 18, wherein:

the repeating of (b) is performed by only translating markup language objects and style sheet objects that were not previously translated; and the constructing at (g) includes reusing markup language nodes and style sheet nodes that were previously translated at (b) and previously deserialized at (f).

20. The one or more non-transitory computer-readable media of claim 18, wherein the input from the user includes one or more of mouse input, keyboard input, and touchscreen input.

* * * * *